United States Patent
Kim et al.

(10) Patent No.: US 11,423,302 B2
(45) Date of Patent: Aug. 23, 2022

(54) ARTIFICIAL INTELLIGENCE LAUNDRY TREATMENT APPARATUS

(71) Applicant: LG ELECTRONICS INC., Seoul (KR)

(72) Inventors: Jinok Kim, Seoul (KR); Yunsik Park, Seoul (KR); Sungmok Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 512 days.

(21) Appl. No.: 16/497,782

(22) PCT Filed: Jun. 13, 2019

(86) PCT No.: PCT/KR2019/007145
§ 371 (c)(1),
(2) Date: Sep. 25, 2019

(87) PCT Pub. No.: WO2020/251086
PCT Pub. Date: Dec. 17, 2020

(65) Prior Publication Data
US 2021/0334641 A1 Oct. 28, 2021

(51) Int. Cl.
*G06K 9/00* (2022.01)
*G06N 3/08* (2006.01)
(Continued)

(52) U.S. Cl.
CPC .............. *G06N 3/08* (2013.01); *D06F 33/43* (2020.02); *D06F 34/05* (2020.02); *D06F 34/20* (2020.02);
(Continued)

(58) Field of Classification Search
CPC .. G06N 3/08; G06N 3/04; D06F 33/43; D06F 34/05; D06F 34/20; D06F 37/266;
(Continued)

(56) References Cited

U.S. PATENT DOCUMENTS

| 2014/0068873 A1* | 3/2014 | Lee | D06F 33/47 8/137 |
| 2017/0243328 A1 | 8/2017 | Lee et al. | |
| 2021/0262142 A1* | 8/2021 | Kim | D06F 37/22 |

FOREIGN PATENT DOCUMENTS

| KR | 1020040045120 | 6/2004 |
| KR | 1020160044979 | 4/2016 |

(Continued)

OTHER PUBLICATIONS

PCT International Application No. PCT/KR2019/007145, Written Opinion of the International Searching Authority dated Apr. 23, 2020, 8 pages.

*Primary Examiner* — Samir A Ahmed
(74) *Attorney, Agent, or Firm* — Lee, Hong, Degerman, Kang & Waimey PC

(57) ABSTRACT

An artificial intelligent laundry treatment apparatus according to an embodiment of the present invention includes: a door including an external cover and an internal glass and configured to open and close a laundry entrance; a gasket formed on an inner circumferential surface of the laundry entrance; a door imaging sensor disposed to face the internal glass and configured to acquire a door image; a gasket imaging sensor configured to acquire a gasket image including a region of the gasket; and a processor configured to classify a state of the door on the basis of the door image, to acquire a gasket contamination degree on the basis of the gasket image, and to determine whether inside cleansing is required for a region including an inside of a drum on the basis of at least one of the classification result of the state of the door or the acquired gasket contamination degree.

14 Claims, 9 Drawing Sheets

(51) Int. Cl.
  *G06T 7/62* (2017.01)
  *D06F 34/05* (2020.01)
  *D06F 33/43* (2020.01)
  *D06F 34/20* (2020.01)
  *D06F 37/26* (2006.01)
  *D06F 39/14* (2006.01)
  *G06K 9/62* (2022.01)
  *G06N 3/04* (2006.01)
  *G06T 7/00* (2017.01)

(52) U.S. Cl.
  CPC ............ *D06F 37/266* (2013.01); *D06F 39/14* (2013.01); *G06K 9/6257* (2013.01); *G06K 9/6268* (2013.01); *G06N 3/04* (2013.01); *G06T 7/001* (2013.01); *G06T 7/62* (2017.01); *G06T 2207/20224* (2013.01)

(58) Field of Classification Search
  CPC .... D06F 39/14; G06K 9/6257; G06K 9/6268; G06T 7/001
  See application file for complete search history.

(56) References Cited

FOREIGN PATENT DOCUMENTS

| | | |
|---|---|---|
| KR | 1020170090162 | 8/2017 |
| KR | 101841248 | 3/2018 |
| WO | 2018114359 | 6/2018 |

\* cited by examiner

ARTIFICIAL INTELLIGENCE LAUNDRY TREATMENT APPARATUS

CROSS-REFERENCE TO RELATED APPLICATIONS

This application is the National Stage filing under 35 U.S.C. 371 of International Application No. PCT/KR2019/007145, filed on Jun. 13, 2019, the contents of which are hereby incorporated by reference herein in its entirety.

FIELD

The present invention relates to a laundry treatment apparatus based on artificial intelligence.

BACKGROUND

In general, a laundry treatment apparatus is an apparatus that can treat laundry through several processes such as washing, rinsing, spinning, and/or drying.

A laundry treatment apparatus can perform a washing operation including a washing process, a rinsing process, and a spinning process as a process for removing contamination of laundry.

The washing process may be a process that removes contaminants on laundry using washing water, the rinsing process may be a process that removes contaminants and a detergent from laundry using washing water, and the spinning process may be a process that removes water from laundry.

Meanwhile, the longer the washing operation of a laundry treatment apparatus continues, the more the cleanliness inside the laundry treatment apparatus may decrease due to remaining contaminants or fur. Accordingly, laundry treatment apparatuses may be provided with an inside cleansing function for cleansing the inside of a tub or a drum, the inside of a door, etc.

However, it is difficult for a user of a laundry treatment apparatus to visually check the contamination degree of the inside and it may also be difficult to memorize an inside cleansing cycle and to periodically use the inside cleansing function.

SUMMARY

An object of the present invention is to provide a laundry treatment apparatus that can more accurately recognize an inside contamination degree of the laundry treatment apparatus.

Another object of the present invention is to provide a laundry treatment apparatus that can enable easy management by inducing a user to perform an inside cleansing function.

An artificial intelligent laundry treatment apparatus according to an embodiment of the present invention includes: a door including an external cover and an internal glass and configured to open and close a laundry entrance; a gasket formed on an inner circumferential surface of the laundry entrance; a door imaging sensor disposed to face the internal glass and configured to acquire a door image; a gasket imaging sensor configured to acquire a gasket image including a region of the gasket; and a processor configured to classify a state of the door on the basis of the door image, to acquire a gasket contamination degree on the basis of the gasket image, and to determine whether inside cleansing is required for a region including an inside of a drum on the basis of at least one of the classification result of the state of the door or the acquired gasket contamination degree.

Depending on embodiments, the laundry treatment apparatus may further include a memory configured to store a classification model, which is learned using a deep learning algorithm, for classifying the state of the door from the door image.

The processor may input the door image as input data of the classification model, and may acquire the classification result based on at least one characteristic point extracted from a region corresponding to the internal glass of the door image from the classification model.

Depending on embodiments, the laundry treatment apparatus may further include a learning processor configured to update the classification model on the basis of the door image or the at least one characteristic point, and the classification result.

The door imaging sensor may be disposed in a space between the external cover and the internal glass.

Depending on embodiments, the memory may store a reference gasket image and the processor may perform image subtraction between a gasket image acquired from the gasket imaging sensor and the reference gasket image, calculate an area of a contaminant existence region of the acquired gasket image on the basis of the image subtraction result, and acquire the gasket contamination degree on the basis of the calculated area.

The larger the calculated area, the more the gasket contamination degree may increase.

Depending on embodiments, the gasket imaging sensor may be disposed on the inner circumferential surface of the laundry entrance.

Depending on embodiments, the laundry treatment apparatus may further include at least one light source disposed on the inner circumferential surface of the laundry entrance, in which the processor may turn on the at least one light source when acquiring the door image or the gasket image.

Depending on embodiments, the processor may control the door imaging sensor to acquire the door image when a washing operation of the laundry treatment apparatus is not performed.

Depending on embodiments, the processor may control the door imaging sensor to acquire the door image after a predetermined time passes from end of the washing operation.

Depending on embodiments, the processor may control the gasket imaging sensor to acquire the gasket image with the door open.

Depending on embodiments, the processor may control at least one of a display or a speaker to output an inside cleansing notice when determining that inside cleansing is required.

Depending on embodiments, the processor may control a communication unit to transmit an inside cleansing notice to a server or a user's terminal when determining that inside cleansing is required.

DETAILED DESCRIPTION

Figure 1:
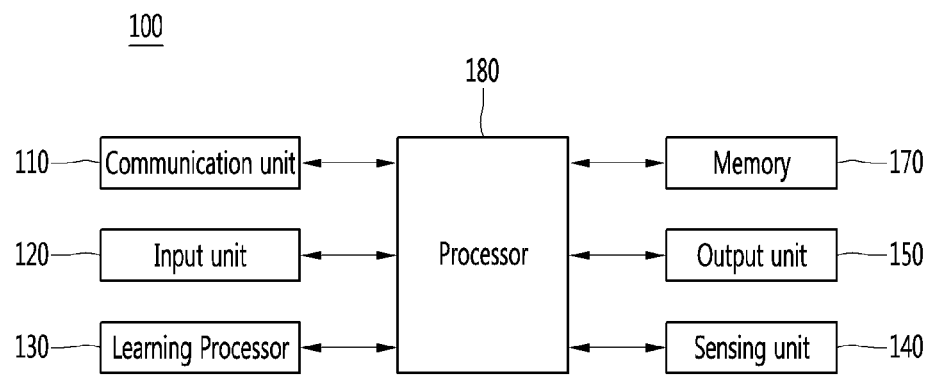
FIG. 1 shows an AI device according to an embodiment of the present invention.

Hereafter, embodiments of the present invention will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present invention makes the subject matter of the embodiments described herein unclear, the detailed description is omitted. The accompanying drawings are provided only for helping easily understand the embodiments described herein without limiting the technological spirit of the present invention and should be construed as including all modifications, equivalents, and replacements that are included in the spirit and scope of the present invention.

Terms including ordinal numbers such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
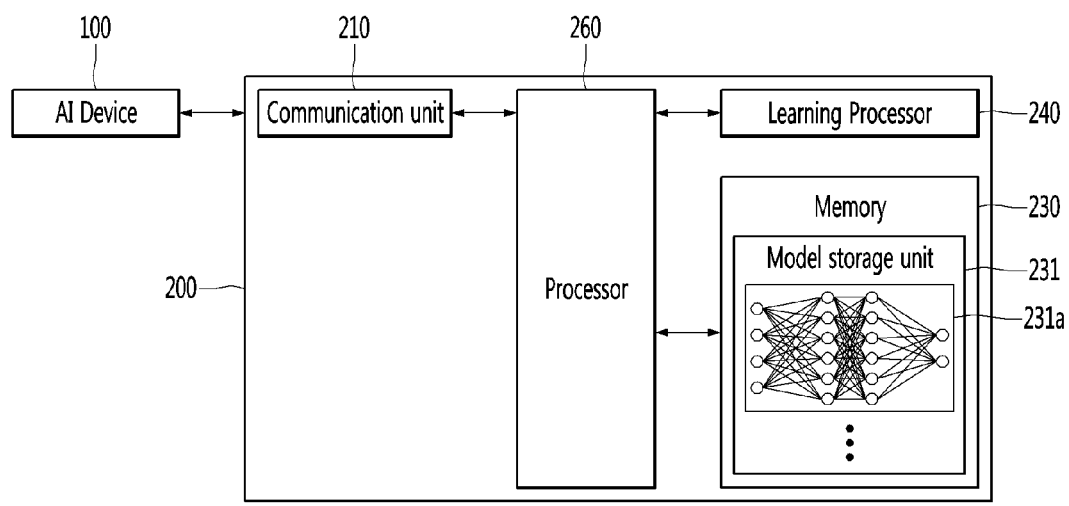
FIG. 2 shows an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
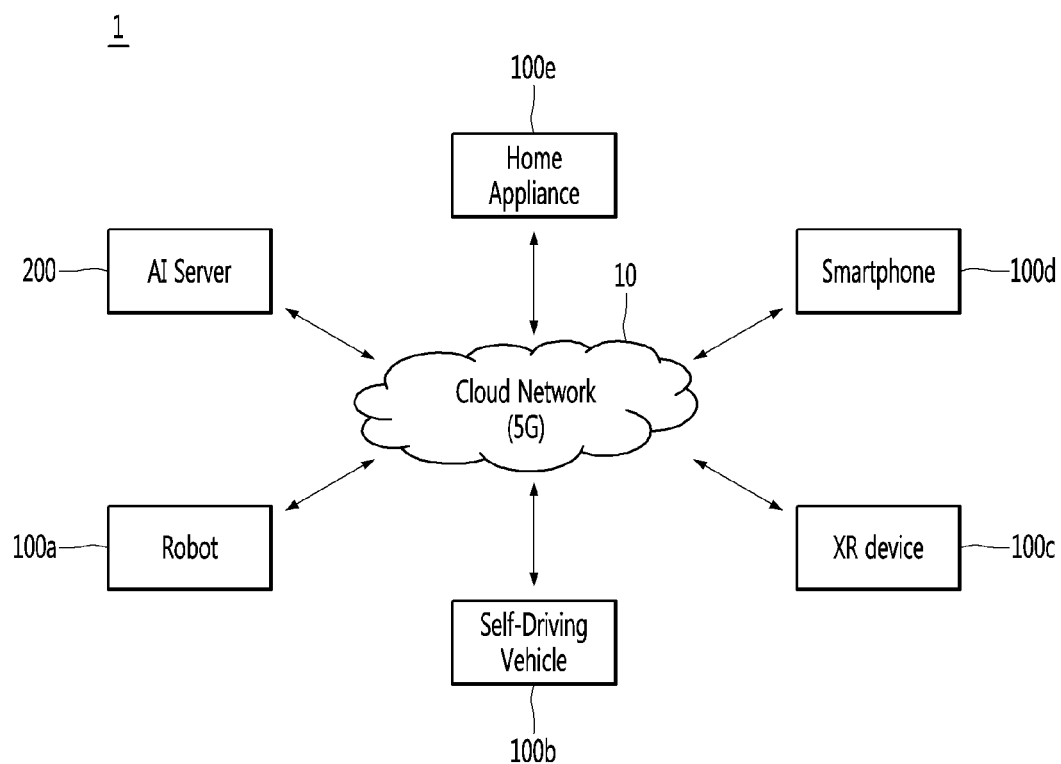
FIG. 3 shows an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the users interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passengers gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
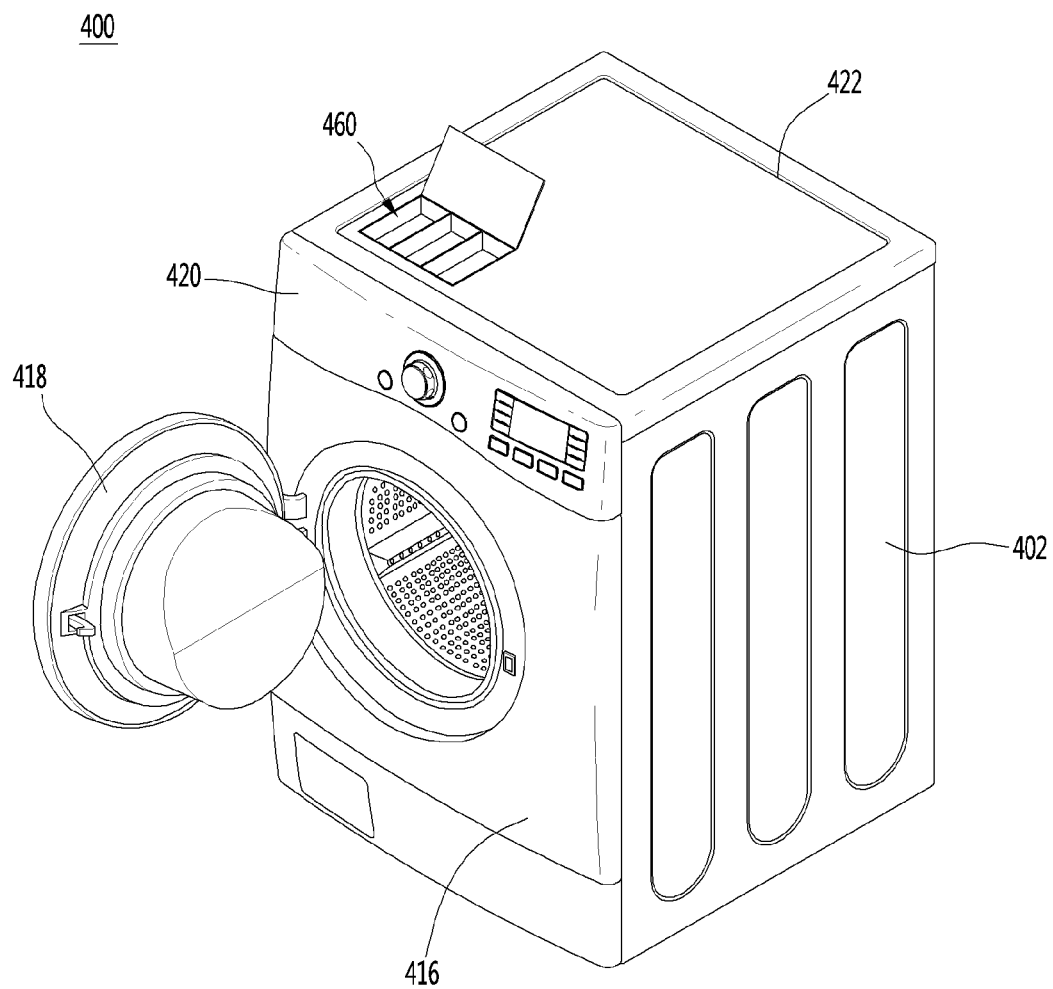
FIG. 4 is a perspective view of a laundry treatment apparatus according to an embodiment of the present invention.
Figure 5:
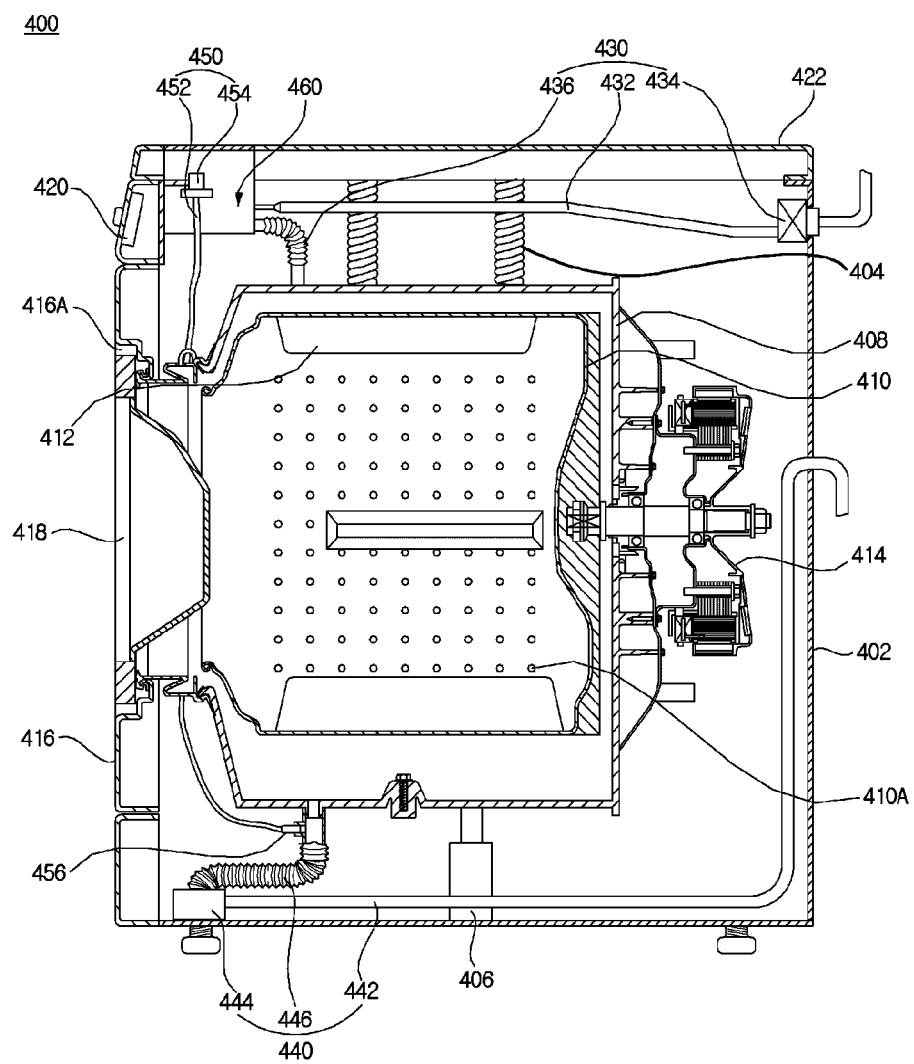
FIG. 5 is a vertical cross-sectional view showing the internal configuration of a laundry treatment apparatus according to an embodiment of the present invention.

FIG. 4 is a perspective view of a laundry treatment apparatus according to an embodiment of the present invention and FIG. 5 is a vertical cross-sectional view showing the internal configuration of a laundry treatment apparatus according to an embodiment of the present invention.

A washing machine that is a kind of laundry treatment apparatus is exemplified in the following description.

Referring to FIGS. 4 and 5, a laundry treatment apparatus 400 in which a control method according to an embodiment of the present invention is implemented may include: a cabinet 402 forming an external appearance; a tub 408 disposed in the cabinet 402; a drum 410 disposed in the tub 408; a lifter 412 mounted on the inner circumferential surface of the drum 410; a driving unit 414 (motor) rotating the drum 410; a cabinet cover 416 mounted on the front surface of the cabinet 402; a door 418 coupled to the cabinet cover 416; and a control panel 420 for inputting operation instructions of the laundry treatment apparatus 400.

In detail, the tub 408 is installed to be able to absorb shock by a spring 404 and a damper 406 in the cabinet 402 and accommodates washing water therein. The drum 410 is rotatably disposed in the tub 408 and has a plurality of through-holes 410A through which washing water passes. A fabric is accommodated in the drum 410.

The lifter 412 is installed on the inner surface of the drum 410 and serves to lift the fabric to a predetermined height such that the fabric falls by gravity when the drum 410 is rotated. The driving unit is disposed behind the tub 408 and rotates the drum 410.

The cabinet cover 416 is mounted ahead of the cabinet 402 and has a laundry entrance 416 formed at the center. The door 418 is rotatably installed on the cabinet cover 416 and opens/closes the laundry entrance 416A. The control panel 420 is disposed over the cabinet cover 416 to display the operation state of the washing machine and has input keys for operation instructions of the washing machine.

A top plate 422 is mounted on the top surface of the cabinet 402 and a water supply unit 430 composed of a water supply hose 432, a water supply valve 434, and a water supply bellows 436 is disposed under the top plate 422. Washing water is supplied into the tub 408 through the water supply unit 430 from the outside of the laundry treatment apparatus.

A detergent supply unit 460 is disposed between the water supply hose 432 and the water supply bellows 436 so that a detergent can be supplied to the tub 408 together with the water that is supplied through the water supply unit 430. A drain unit 440 composed of a drain hose 442, a drain pump 444, and a drain bellows 446 is disposed under the tub 408 to discharge washing water used for washing and rinsing to the outside.

Depending on embodiments, the laundry treatment apparatus 400 may include a water level sensing unit 450 that senses the level of the water supplied to the tub 408. The water level sensing unit 450 includes: an air hose 452 that has an end connected to a lower portion of the tub 408 to communicate with it and is filled with air; and a water level sensor 454 that is connected to the other end of the air hose 452 to communicate with it and measures the water level in the tub 408 from a frequency change amount according to a pressure change of air that is transmitted through the air hose 452.

An end of the air hose 452 may be directly connected to the lower portion of the tub 408 or may be connected to an air chamber 456 formed at any one of the lower portions of the drain bellows 446 and the tub 408.

In detail, the air chamber 456 is a barrel-shaped structure filled with air, and has a side fitted to the drain bellows 446 to communicate with it such that washing water flows inside/outside, and the other side to which the air hose 452 is connected.

The water sensor 454 measures the level of washing water in the tub 408 from a change of the pressure of the air transmitted by the air hose 452. That is, when the level of washing water supplied to the tub 408 is changed, washing water flows into the air chamber 456 and the air pressure applied to the air hose 452 changes. The air hose 452 transmits water pressure to the water level sensor 454 through air and the water level sensor 454 senses the level of the washing water accommodated in the tub 408 on the basis of a frequency change amount that changes in accordance with a change in pressure.

As the washing operation of the laundry treatment apparatus 400 is continuously performed, the inside of the drum 410, the inside of the door 418, the laundry entrance 416A, etc. may be contaminated by dust, contaminants, fur, etc. As the inside of the laundry treatment apparatus 400 is contaminated, laundry may not be effectively washed and a bad smell, etc. may be generated from the inside of the laundry treatment apparatus 400 or laundry.

In order to solve this problem, a user can cleanse the inside of the laundry treatment apparatus 400 using an inside cleansing function that is implemented separately from the washing operation function. Alternatively, a user can cleanse the inside of the laundry treatment apparatus 400 by putting a specific detergent for inside cleansing into the laundry treatment apparatus 400 and then performing the washing operation function.

However, it is not easy for a user to visually check whether the inside of the laundry treatment apparatus 400 has been contaminated in person. Further, inside cleansing of the laundry treatment apparatus 400 is intermittently performed, it is also not easy for a user to memorize the inside cleansing cycle. Accordingly, it is required to provide a method of sensing necessity of inside cleansing of the laundry treatment apparatus 400 by itself and inducing a user to perform inside cleansing.

Figure 6:
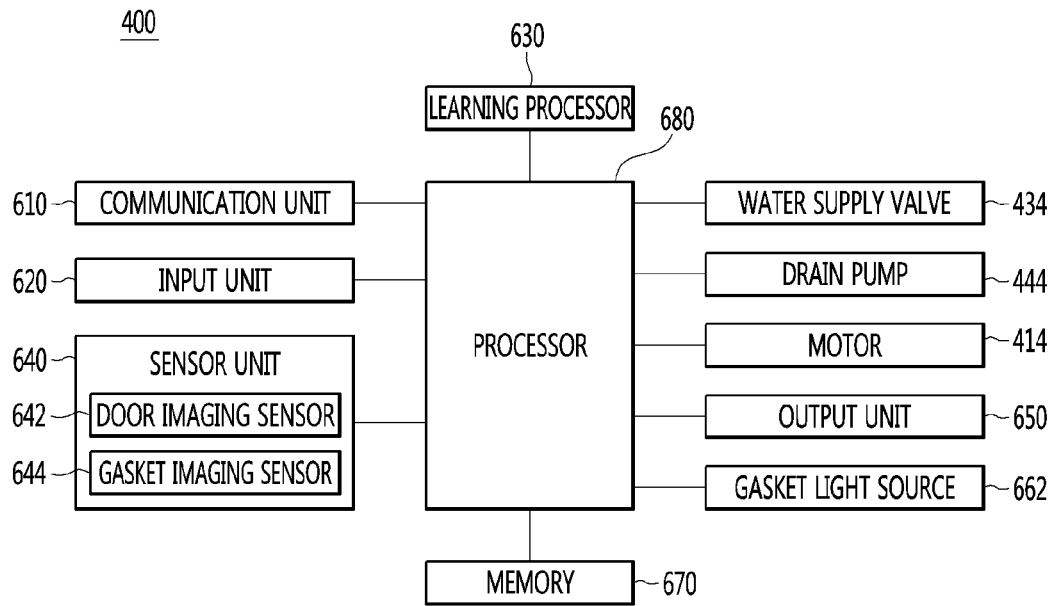
FIG. 6 is a view showing a control configuration of a laundry treatment apparatus according to an embodiment of the present invention.
Figure 7:
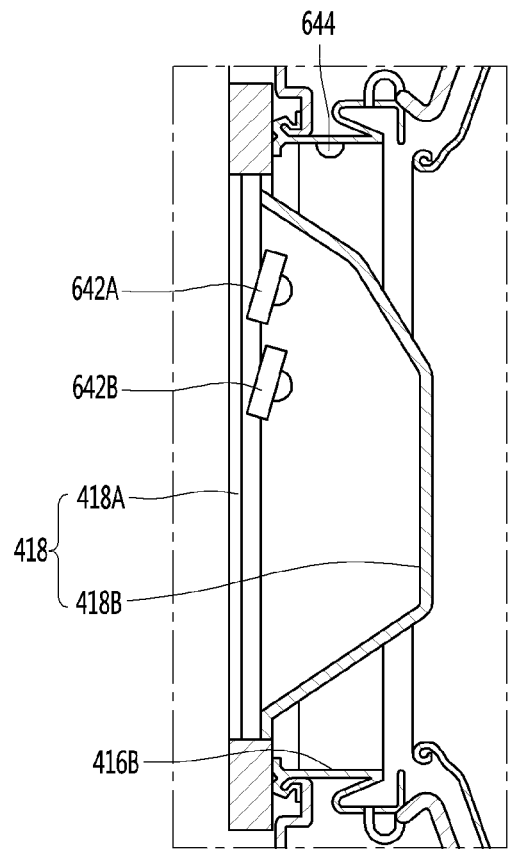
FIG. 7 is a view showing an example of installation positions of a door imaging sensor and a gasket imaging sensor shown in FIG. 6.

FIG. 6 is a view showing a control configuration of a laundry treatment apparatus according to an embodiment of the present invention. FIG. 7 is a view showing an example of installation positions of a door imaging sensor and a gasket imaging sensor shown in FIG. 6.

Referring to FIG. 6, the laundry treatment apparatus 400 may include a communication unit 610, an input unit 620, a learning processor 630, a sensor unit 640, an output unit 650, a gasket light source 662, a memory 670, and a processor 680. The components shown in FIG. 6 are examples for the convenience of description and the laundry treatment apparatus 400 may include more or less components than the components shown in FIG. 6.

Meanwhile, the laundry treatment apparatus 400 may correspond to an example of the AI device 100 described above with reference to FIGS. 1 to 3. Accordingly, the contents related to the AI device 100 described above with reference to FIGS. 1 to 3 can be applied in the same way to the laundry treatment apparatus 400 and the components included in the laundry treatment apparatus 400.

The communication unit 610 may include at least one communication module for connecting the laundry treatment apparatus 400 to a user's terminal, etc. through a network. The at least one communication module can support any one of the communication technologies described with reference to FIG. 1. For example, the laundry treatment apparatus 400 may be connected with a network through an access point such as a router.

The input unit 620 may include at least one input means for inputting a predetermined signal or data to the laundry treatment apparatus 400 in response to an operation by a user. For example, the at least one input means may include a button, a dial, a touch pad, a microphone, etc. The input unit 620 may be disposed on the control panel 420 of FIG. 4, but is not necessarily like that.

The learning processor 630 can perform a learning operation for a door transparency/opacity classifying model to be described below with reference to FIGS. 8 to 9.

The sensor unit 640 may include at least one sensor that acquires data for determining whether inside cleansing of the laundry treatment apparatus 400 is required.

For example, the sensor unit 640 may include a door imaging sensor 642 and a gasket imaging sensor 644.

Referring to FIG. 7 in relation to the door imaging sensor 642 and the gasket imaging sensor 644, the door 418 of the laundry treatment apparatus 400 may include an external cover 418A and an internal glass 418B. The external cover 418A and the internal glass 418B are each made of a transparent material (e.g., plastic), so a user can visually check the inside of the drum 410 through the door 418.

A space may be formed between the external cover 418A and the internal glass 418B. The door imaging sensor 642 may be disposed in the space. Since the door imaging sensor 642 is disposed in the space, shock or foreign substances from the outside of the laundry treatment apparatus 400 and contamination or contact due to washing water or laundry in the drum 410 can be effectively prevented.

For example, as shown in FIG. 7, a plurality of door imaging sensors 642A and 642B may be disposed between the external cover 418A and the internal glass 418B. For example, a first door imaging sensor 642A may be implemented as a stereo camera (or a 3D camera) including a plurality of image sensors and a second door imaging sensor 642B may be implemented as a 2D camera including one image sensor, but they are not limited thereto.

The plurality of door imaging sensors 642A and 642B are each fastened to the inner wall of the external cover 418A to fact the internal glass 418B and can be controlled to acquire image data (a door image) including the internal glass 418B by the processor 680. The processor 680 can combine the door images acquired by the plurality of door imaging sensors 642A and 642B or can select and input any one door image to the door transparency/opacity classifying model.

On the other hand, depending on embodiments, a gasket 416B for preventing the washing water in the drum 410 from leaking to the outside may be formed on the inner circumferential surface of the laundry entrance 416A. For example, the gasket 416B can prevent washing water from leaking between the drum 410 and the cabinet 402, between the drum 410 and the door 418, etc. The gasket 416B may be implemented by a rubber material, but is not necessarily like that.

Meanwhile, a gasket imaging sensor 644 may be disposed on the inner circumferential surface of the laundry entrance 416A. The gasket imaging sensor 644 may be implemented as a camera including an image sensor.

The gasket imaging sensor 644 is disposed to face a facing surface of the inner circumferential surface of the laundry entrance 416B and can acquire image data (a gasket image) including the gasket 416B. Since when the door 418 is closed, the internal glass 418B is positioned between the gasket imaging sensor 644 and the gasket 416B, the processor 680 can control the gasket imaging sensor 644 to acquire a gasket image with the door 418 open.

Depending on embodiments, at least one gasket light source 662 may be disposed on the inner circumferential surface of the laundry entrance 416A. Though not shown, the at least one gasket light source 662 may be disposed to face a region corresponding to a region that the gasket imaging sensor 644 faces.

The at least one gasket light source 662 can radiate light toward the internal glass 418B and the gasket 416B when acquiring the door image and/or the gasket image. Accordingly, a sufficient amount of light for acquiring a door image and a gasket image can be secured.

FIG. 6 is described above.

Depending on embodiments, the sensor unit 640 may further include at least one sensor (e.g., a water level sensor 454) that senses various data during the washing operation of the laundry treatment apparatus 400.

The output unit 650 may have an output means for informing a user of various items of information related to the operation of the laundry treatment apparatus 400. For example, the output unit 650 may include a speaker or a buzzer as an audio output means and may include a display as a graphic or text output means. For example, the output unit 650 may be disposed on the control panel 420 of FIG. 4, but is not limited thereto.

The memory 670 can store various data such as control data for controlling the operation of the laundry treatment apparatus 400, data or algorithms related to setting of washing courses, and data for determining whether there is an error in the laundry treatment apparatus 400.

The memory 670 can store a door image that is acquired through the door imaging sensor 642 and a gasket image that is acquired through the gasket imaging sensor 644.

The memory 670 can store data or algorithms for classifying transparency/opacity of the door 418 from a door image. For example, the memory 670 can store a door transparency/opacity classifying model leaned by the learning processor 630 or a server.

The memory 670 can store an algorithm for acquiring a contamination degree of the gasket 416B from a gasket image.

Hardware-wise, the memory 670 may include various storage devices such as a ROM, a RAM, an EPROM, a flash drive, and a hard drive.

The processor 680 can control the entire operation of the laundry treatment apparatus 400. The processor 680 can control a washing operation including a washing process, a rinsing process, a spinning process, and/or a drying process. The processor 680 can control the washing process in accordance with a preset algorithm and can control driving of the motor 414, the water supply valve 434, and the drain pump 444 in accordance with each process.

Meanwhile, the processor 680 according to an embodiment of the present invention can acquire a door image by controlling the door imaging sensor 642 and can classify the state of the door into transparency or opacity on the basis of the acquired door image. For example, the processor 680 can acquire the door image at every predetermined cycle without the washing operation performed, but the point in time of acquiring a door image may be various.

Further, the processor 680 according to an embodiment of the present invention can acquire a gasket image by controlling the gasket imaging sensor 644 and can acquire a contamination degree of the gasket 416B on the basis of the acquired gasket image. For example, the processor 680 can acquire the gasket image at every predetermined cycle with the door 418 open, but the point in time of acquiring a gasket image may be various.

The processor 680 can determine whether inside cleansing of the laundry treatment apparatus 400 is required on the basis of the classification result of the door state (transparency/opacity) and/or the contamination degree of the gasket 416B. When inside cleansing is required as the result of determination, the processor 680 can output an inside cleansing notice through the output unit 650 or can provide the inside cleansing notice to a user's terminal. Alternatively, the processor 680 may automatically activate an inside cleansing course and stand by input for staring the inside cleansing course.

The processor 680 may include at least one processor or controller that controls the operation of the laundry treatment apparatus 400. In detail, the processor 680 may include at least one CPU, AP (application processor), microcomputer (or Micom), integrated circuit, ASIC (application specific integrated circuit), etc.

Figure 8:
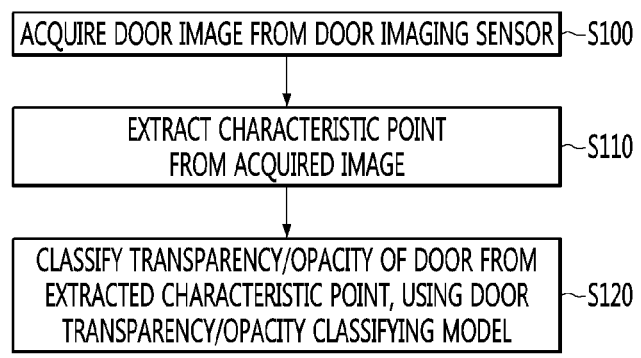
FIG. 8 is a flowchart illustrating an operation of classifying transparency/opacity of a door from a door image by a laundry treatment apparatus according to an embodiment of the present invention.

FIG. 8 is a flowchart illustrating an operation of classifying transparency/opacity of a door from a door image by a laundry treatment apparatus according to an embodiment of the present invention.

Referring to FIG. 8, the laundry treatment apparatus 400 can acquire a door image from the door imaging sensor 642 (S100).

The processor 680 of the laundry treatment apparatus 400 can acquire a door image by controlling the door imaging sensor 642.

For example, the processor 680 can acquire the door image at every predetermined cycle without the washing operation performed. Alternatively, the processor 680 can acquire the door image at a point in time when a predetermined time passes after the washing operation is finished. The point in time of acquiring a door image may be changed in various ways, depending on the implementation manner.

Meanwhile, the processor 680 can turn on the gasket light source 662 when acquiring the door image. Light emitted from the gasket light source 662 is radiated toward the internal glass 418B, whereby the door imaging sensor 642 can effectively acquire a door image including the internal glass 418B.

The laundry treatment apparatus 400 can extract at least one characteristic point by processing the acquired door image (S110). The laundry treatment apparatus 400 can classify the state of the door 418 from the characteristic point extracted in step S110 using the door transparency/opacity classifying model (S120).

The laundry treatment apparatus 400 can classify the state of the door 418 from the door image using a deep neural network (DNN) based on machine learning. For example, the state of the door 418 may be classified into a first state corresponding to 'transparent' or 'non-contaminated' and a second state corresponding to 'opaque' or 'contaminated'.

For example, the laundry treatment apparatus 400 can use a CNN (convolutional neural network) of the deep neural network, but is not necessarily limited thereto. The CNN (convolutional neural network) is a model simulating the brain function of human and designed on the basis of the assumption that when a person recognizes an object, the person extracts fundamental characteristics of the object, make complicated calculation in the brain, and then recognizes the object on the basis of the result.

On the basis of this, the processor 680 can extract at least one characteristic point related to a transparency degree of the internal glass 418B from the acquired door image and classify the state of the door 418 on the basis of the extracted characteristic point.

For example, the processor 680 can extract the color, brightness, saturation, and various pixel patterns of the region corresponding to the internal glass 418B in a door image, but is not limited thereto.

The processor 680 can input at least one characteristic point extracted from a door image to a door transparency/opacity classifying model learned before. The door transparency/opacity classifying model may have been learned by the learning processor 630 of the laundry treatment apparatus 400. Depending on embodiments, the door transparency/opacity classifying model may have been learned by a server (e.g., the AI server 200 of FIG. 2) and provided to the laundry treatment apparatus 400.

The door transparency/opacity classifying model can output a classification result based on the input at least one characteristic point. The classification result can show whether the state of the door 418 is transparency (first state) or opacity (second state). When the door 418 is a transparent state, it may mean that the cleanliness degree inside the laundry treatment apparatus 400 is higher than a reference cleanliness degree. On the contrary, when the door 418 is an opaque state, it may mean that contaminants or fur exists on the internal glass 418B, so the cleanliness degree inside the laundry treatment apparatus 400 is lower than the reference cleanliness degree.

The processor 680 can determine whether inside cleansing of the laundry treatment apparatus 400 is required on the basis of the classification result and can induce a user to perform the inside cleansing function (or inside cleansing course) on the basis of the result of determination. Contents related to this will be described below with reference to FIG. 12.

On the other hand, steps S110 and S120 may be performed by a server or another device connected with the laundry treatment apparatus 400. That is, the processor 680 can transmit the door image to the server and the server can acquire a classification result about the state of the door 418 and can transmit the classification result to the laundry treatment apparatus 400 or a user's terminal.

Figure 9:
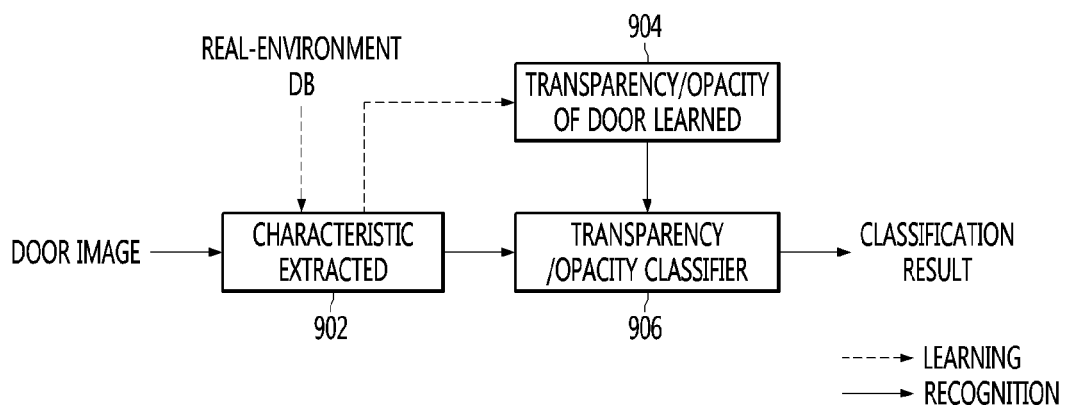
FIG. 9 is a view illustrating a learning operation and a classifying operation of a transparency/opacity classifier included in a door transparency/opacity classifying model of a laundry treatment apparatus according to an embodiment of the present invention.

FIG. 9 is a view illustrating a learning operation and a classifying operation of a transparency/opacity classifier included in a door transparency/opacity classifying model of a laundry treatment apparatus according to an embodiment of the present invention.

Referring to FIG. 9, when a door image is input, the processor 680 of the laundry treatment apparatus 400 can perform a classifying operation that extracts at least one characteristic point from the input door image (902), classifies transparency or opacity of the door 418 on the basis of the extracted characteristic point (906), and outputs the classification result (transparency or opacity). Depending on embodiments, the processor 680 can output one classification result as the final classification result, but may perform the classifying operation several times and then output the final classification result on the basis of the several-time classification results, thereby being able to further improve classification accuracy.

On the other hand, the learning processor 630 of the laundry treatment apparatus 400 or a learning processor of a server can perform a learning operation on the transparency/opacity classifier included in the door transparency/opacity classifying model.

For example, a learning processor can construct a database (real-environment DB) by collecting several door images and perform learning (904) of the transparency/opacity classifier using the characteristic points extracted from the acquired door image and the classification result of the transparency/opacity classifier. Parameters (weight and/or bias, etc.) of an artificial neural network included in the transparency/opacity classifier can be updated through the learning (904). The more the number of times of performing the learning, the more the classification accuracy of the door transparency/opacity classifying model can be improved.

Figure 10:
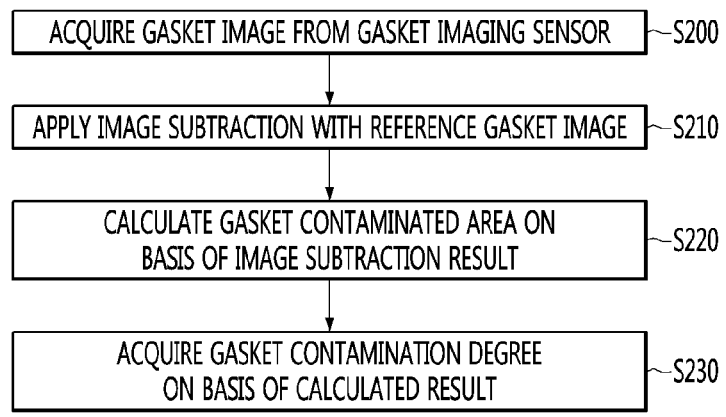
FIG. 10 is a flowchart illustrating an operation of acquiring a gasket contamination degree from a gasket image by a laundry treatment apparatus according to an embodiment of the present invention.
Figure 11:
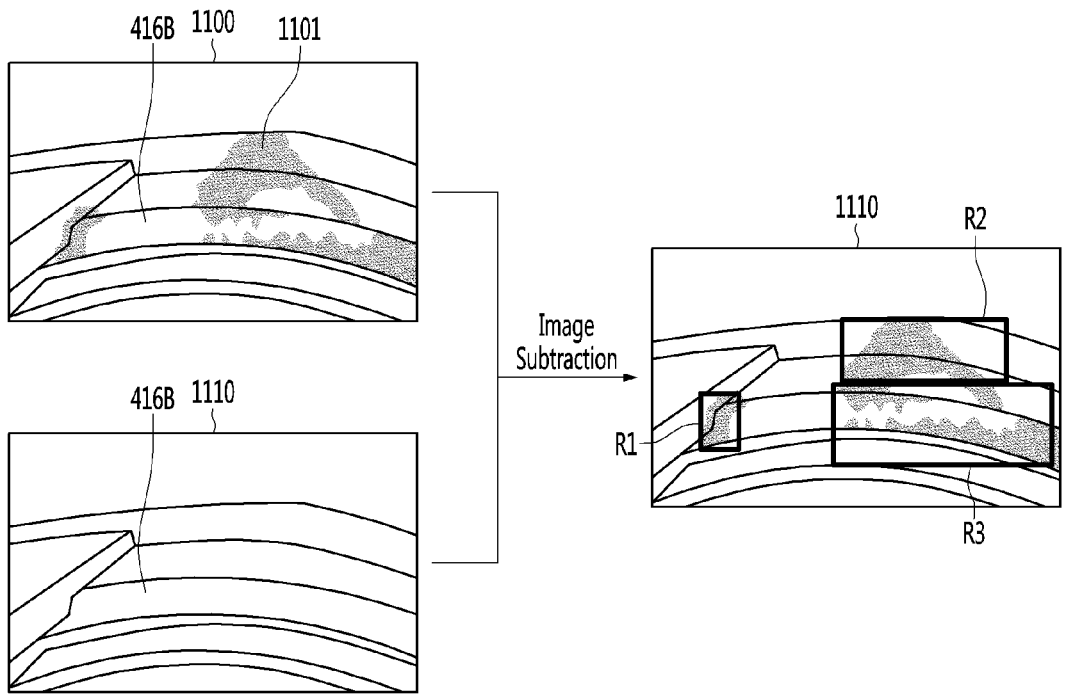
FIG. 11 is an exemplary view related to the operation of the laundry treatment apparatus shown in FIG. 10.

FIG. 10 is a flowchart illustrating an operation of acquiring a gasket contamination degree from a gasket image by a laundry treatment apparatus according to an embodiment of the present invention. FIG. 11 is an exemplary view related to the operation of the laundry treatment apparatus shown in FIG. 10.

Referring to FIGS. 10 to 11, the laundry treatment apparatus 400 can acquire a gasket image using the gasket imaging sensor 644 (S200).

The processor 680 can acquire a gasket image 1100 by controlling the gasket imaging sensor 644.

For example, the processor 680 can acquire a gasket image 1100 at every predetermined cycle with the door 418 open. Alternatively, the processor 480 can acquire a gasket image 1100 every time a change from a closed state to an open state of the door 418 is sensed. The point in time of acquiring the gasket image 1100 may be changed in various ways, depending on the implementation manner.

Meanwhile, the processor 680 can turn on the gasket light source 662 when acquiring the door image. As described with reference to FIGS. 6 to 7, since the gasket light source 662 is disposed to face a region corresponding to the region that the gasket imaging sensor 644 faces, the gasket imaging sensor 644 can effectively acquire a gasket image 1100 including the gasket 416B.

As shown in FIG. 11, the gasket image 1100 may include a partial region of the gasket 416B. For example, when the gasket 416B is contaminated, contaminants (fur etc.) may exist on the gasket 416B, and in this case, a contaminant 1101 may be included in the gasket image 1100.

The laundry treatment apparatus 400 can perform image subtraction from a reference gasket image stored in advance, on the acquired gasket image.

The reference gasket image 1110 may be an image acquired when the gasket 416B was not contaminated. That is, as shown in FIG. 11, a contaminant may not exist on the gasket 416B included in the reference gasket image 1110.

The processor 680 can perform image subtraction between the acquired gasket image 1100 and the reference gasket image 1110. A well-known image subtraction of image differencing algorithm may be stored in the memory 670 and the processor 680 can perform image subtraction between the acquired gasket image 1100 and the reference gasket image 1110 using the stored image subtraction algorithm.

The laundry treatment apparatus 400 can calculate a contaminated area of the gasket 416B on the basis of the image subtraction result (S220) and can acquire a gasket contamination degree on the basis of the calculation result (S230).

The image subtraction result may correspond to the region where the contaminant 1101 exists. The processor 680 can calculate the area of each of regions R1, R2, and R3 where the contaminant 1101 exists and can calculate the contaminated area of the gasket 416B by summing up the areas of the regions R1, R2, and R3.

The processor 680 can acquire a gasket contamination degree on the basis of the calculated contaminated area. The larger the contaminated area, the higher the gasket contamination degree may be.

For example, the gasket contamination degree can be classified and provided into predetermined grades (good, normal, bad). In this case, the processor 680 can acquire a gasket contamination degree corresponding to 'good' when the calculated contaminated area is less than a first reference area. In this case, the processor 680 can acquire a gasket contamination degree corresponding to 'normal' when the calculated contaminated area is the first reference area or more and is less than a second reference area. In this case, the processor 680 can acquire a gasket contamination degree corresponding to 'bad' when the calculated contaminated area is the second reference area or more.

Depending on embodiments, the gasket contamination degree may be provided as a numerical value type corresponding to the contaminated area.

The processor 680 can determine whether inside cleansing of the laundry treatment apparatus 400 is required on the basis of the acquired gasket contamination degree and can induce a user to perform the inside cleansing function (or inside cleansing course) on the basis of the result of determination. Contents related to this will be described below with reference to FIG. 12.

On the other hand, steps S210 and S230 may be performed by a server or another device connected with the laundry treatment apparatus 400. That is, the processor 680 can transmit the gasket image to the server and the server can acquire a gasket contamination degree on the basis of the received gasket image and can transmit the gasket contamination degree to the laundry treatment apparatus 400 or a user's terminal.

Figure 12:
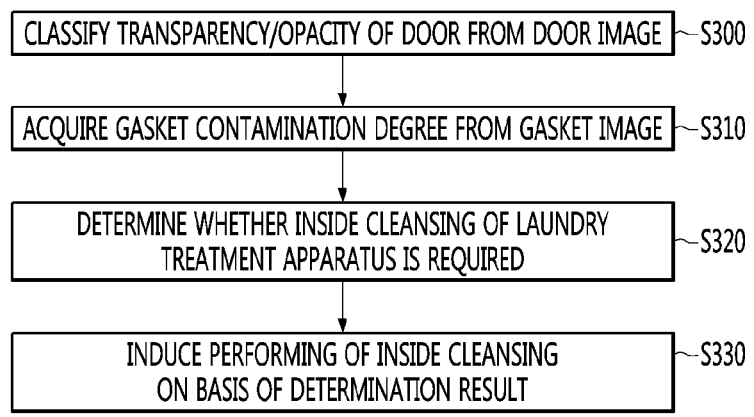
FIG. 12 is a flowchart illustrating an operation of determining whether inside cleansing of a laundry treatment apparatus is required by the laundry treatment apparatus according to an embodiment of the present invention.
Figure 13:
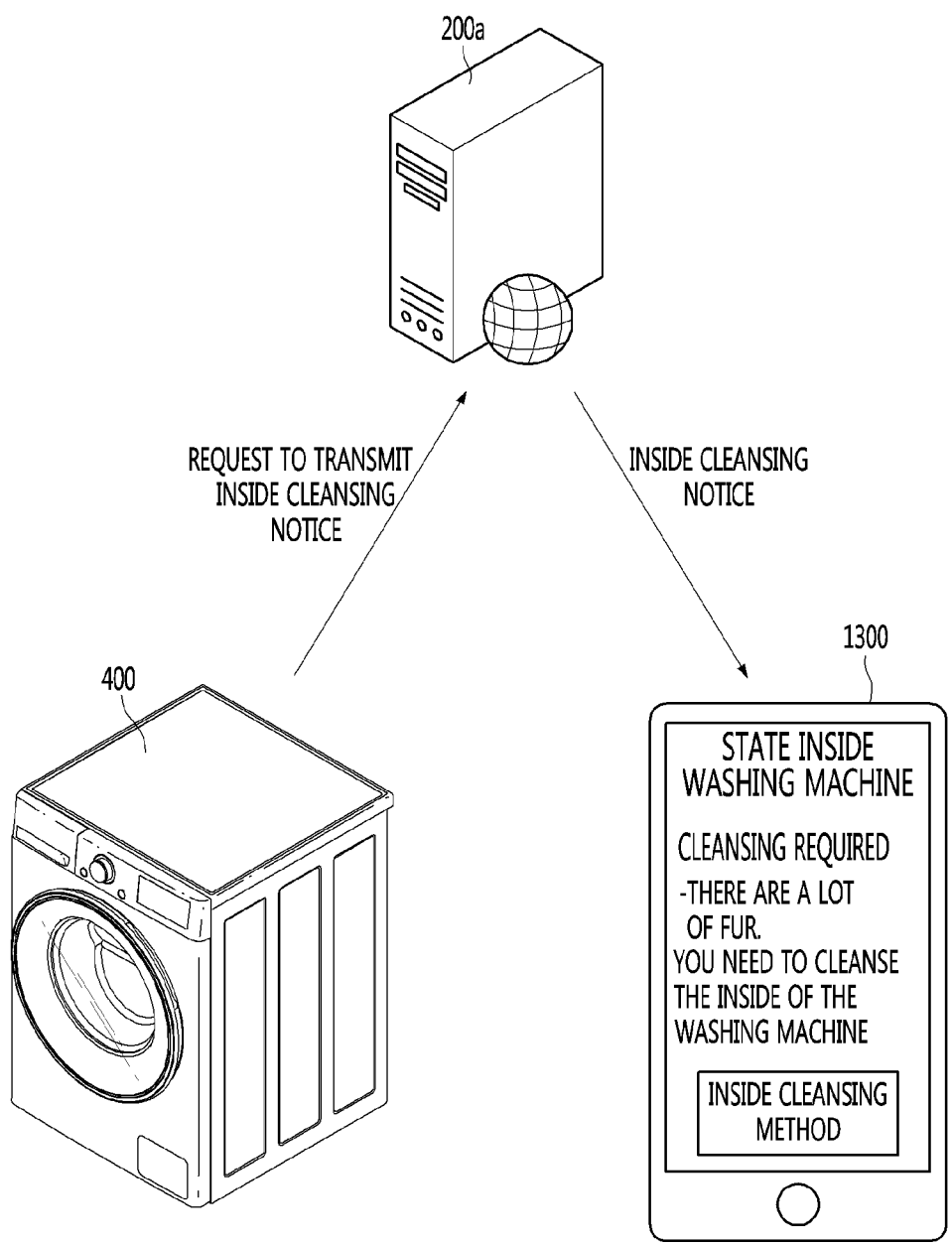
FIG. 13 is a view showing an example of transmitting an inside cleansing notice to a user's terminal through a server by a laundry treatment apparatus.

FIG. 12 is a flowchart illustrating an operation of determining whether inside cleansing of a laundry treatment apparatus is required by the laundry treatment apparatus according to an embodiment of the present invention. FIG. 13 is a view showing an example of transmitting an inside cleansing notice to a user's terminal through a server by a laundry treatment apparatus.

Referring to FIG. 12, the laundry treatment apparatus 400 can classify the state of the door 418 from a door image (S300) and can acquire a gasket contamination degree from a gasket image (S310).

Step S300 may mean steps S100 to S120 of FIG. 8 and step S310 may mean steps S200 to S230 of FIG. 10.

The laundry treatment apparatus 400 can determine whether inside cleansing of the laundry treatment apparatus 400 is required on the basis of at least one of the classification result or the acquired gasket contamination degree (S320).

The method of determining whether inside cleansing is required may be implemented in various ways. It is assumed in the following description that the classification result corresponds to 'transparent' or 'opaque' and the gasket contamination degree is classified into 'good', 'normal', and 'bad'.

For example, the processor 680 can determine that inside cleansing is required when the state of the door 418 is classified into 'opaque' and can determine that inside cleansing is not required when the state is classified into 'transparent'.

For example, the processor 680 can determine that inside cleansing is required when the gasket contamination degree is 'bad' and can determine that inside cleansing is not required when the gasket contamination degree is 'good' or 'normal'.

As another example, the processor 680 can determine whether inside cleansing is required on the basis of a combination of the classification result and the gasket contamination degree.

For example, when the state of the door 418 is classified into 'opaque' and the gasket contamination degree is 'normal' or 'bad', the processor 680 can determine that inside cleansing is required. Further, when the state of the door 418 is classified into 'transparent' and the gasket contamination degree is 'bad', the processor 680 can determine that inside cleansing is required.

When it is determined that inside cleansing is required, the laundry treatment apparatus 400 can induce a user to perform the inside cleansing function of the laundry treatment apparatus 400 (S330).

When determining that inside cleansing of the laundry treatment apparatus 400 is required, the processor 680 can induce a user to perform the inside cleansing function in various ways.

For example, the processor 680 can output an inside cleansing notice through the output unit 650 of the laundry treatment apparatus 400.

Alternately, the processor 680 can transmit an inside cleansing notice to a user's terminal directly or through a server.

For example, as shown in FIG. 13, the processor 680 can transmit a request to transmit an inside cleansing notice to a server 200*a* connected with the laundry treatment apparatus 400. The server 200*a* can transmit the inside cleansing notice to a user's terminal 1300 in response to the received request. The terminal 1300 can inform the user that inside cleansing of the laundry treatment apparatus 400 is required by outputting an image corresponding to the received inside cleansing notice.

The user performs the inside cleansing function of the laundry treatment apparatus 400 on the basis of the inside cleansing notice, thereby being able to more conveniently manage the laundry treatment apparatus 400.

That is, according to an embodiment of the present invention, the laundry treatment apparatus 400 includes the door imaging sensor 642 and/or the gasket imaging sensor 644, so it can automatically determine whether the inside of the laundry treatment apparatus 400 has been contaminated and inside cleansing is required.

In particular, the laundry treatment apparatus 400 can accurately determine the state of the door 418 and whether the inside of the laundry treatment apparatus 400 has been contaminated depending on the state, using a classification model based on artificial intelligence for a door image acquired from the door imaging sensor 642. Accordingly, it is possible to effectively manage the cleanliness of the inside of the laundry treatment apparatus 400.

Further, a user of the laundry treatment apparatus 400 can conveniently acquire information about whether inside cleansing is required even without visually checking whether the inside of the laundry treatment apparatus 400 has been contaminated in person, so he/she can more conveniently manage the laundry treatment apparatus 400.

According to an embodiment of the present invention, the laundry treatment apparatus includes the door imaging sensor and/or the gasket imaging sensor, so it can automatically determine whether the inside of the laundry treatment apparatus has been contaminated and inside cleansing is required.

Further, the laundry treatment apparatus can accurately determine the state of the door and whether the inside of the laundry treatment apparatus has been contaminated depending on the state, using a classification model based on artificial intelligence for a door image acquired from the door imaging sensor. Accordingly, it is possible to effectively manage the cleanliness of the inside of the laundry treatment apparatus.

Further, a user of the laundry treatment apparatus can conveniently acquire information about whether inside cleansing is required even without visually checking whether the inside of the laundry treatment apparatus has been contaminated in person, so he/she can more conveniently manage the laundry treatment apparatus.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. A laundry treatment apparatus comprising:
   a door including an external cover and an internal glass and configured to open and close a laundry entrance;
   a gasket formed on an inner circumferential surface of the laundry entrance;
   a door imaging sensor disposed to face the internal glass and configured to acquire a door image;
   a gasket imaging sensor configured to acquire a gasket image including a region of the gasket; and
   a processor configured to classify a state of the door on the basis of the door image, to acquire a gasket contamination degree on the basis of the gasket image, and to determine whether inside cleansing is required for a region including an inside of a drum on the basis of at least one of the classification result of the state of the door or the acquired gasket contamination degree.

2. The laundry treatment apparatus of claim 1, further comprising a memory configured to store a classification model, which is learned using a deep learning algorithm, for classifying the state of the door from the door image.

3. The laundry treatment apparatus of claim 2, wherein the processor inputs the door image as input data of the classification model, and
   acquires the classification result based on at least one characteristic point extracted from a region corresponding to the internal glass of the door image from the classification model.

4. The laundry treatment apparatus of claim 3, further comprising a learning processor configured to update the classification model on the basis of the door image or the at least one characteristic point, and the classification result.

5. The laundry treatment apparatus of claim 1, wherein the door imaging sensor is disposed in a space between the external cover and the internal glass.

6. The laundry treatment apparatus of claim 1, further comprising a memory storing a reference gasket image,
   wherein the processor performs image subtraction between a gasket image acquired from the gasket imaging sensor and the reference gasket image,
   calculates an area of a contaminant existence region of the acquired gasket image on the basis of the image subtraction result, and
   acquires the gasket contamination degree on the basis of the calculated area.

7. The laundry treatment apparatus of claim 6, the larger the calculated area, the more the gasket contamination degree increases.

8. The laundry treatment apparatus of claim 1, wherein the gasket imaging sensor is disposed on the inner circumferential surface of the laundry entrance.

9. The laundry treatment apparatus of claim 1, further comprising at least one light source disposed on the inner circumferential surface of the laundry entrance,
   wherein the processor turns on the at least one light source when acquiring the door image or the gasket image.

10. The laundry treatment apparatus of claim 1, wherein the processor controls the door imaging sensor to acquire the door image when a washing operation of the laundry treatment apparatus is not performed.

11. The laundry treatment apparatus of claim 10, wherein the processor controls the door imaging sensor to acquire the door image after a predetermined time passes from end of the washing operation.

12. The laundry treatment apparatus of claim 1, wherein the processor controls the gasket imaging sensor to acquire the gasket image with the door open.

13. The laundry treatment apparatus of claim 1, wherein the processor controls at least one of a display or a speaker to output an inside cleansing notice when determining that inside cleansing is required.

14. The laundry treatment apparatus of claim 1, wherein the processor controls a communication unit to transmit an inside cleansing notice to a server or a user's terminal when determining that inside cleansing is required.

* * * * *